Dec. 8, 1959  L. L. GENUIT  2,916,685
DIRECT CURRENT MOTOR SPEED CONTROL SYSTEM
Filed Aug. 13, 1956  3 Sheets-Sheet 1

Inventor:
Luther L. Genuit,
by *Robert G. Irish*
His Attorney.

Inventor:
Luther L. Genuit,
by [signature]
His Attorney.

United States Patent Office 2,916,685
Patented Dec. 8, 1959

2,916,685

DIRECT CURRENT MOTOR SPEED CONTROL SYSTEM

Luther L. Genuit, Fort Wayne, Ind., assignor to General Electric Company, a corporation of New York Application August 13, 1956, Serial No. 603,705

9 Claims. (Cl. 318—332)

This invention relates to control systems for direct current motors and more particularly to a system for operating a direct current motor and selectively controlling the motor speed from an alternating current source.

There are many applications for electric motors in which variable speed is highly desirable, for example, in the operation of machine tools, home workshop equipment, etc. The common types of alternating current motors, i.e., induction and synchronous motors cannot be operated at varying speeds when supplied with alternating current of fixed frequency. Direct current motors on the other hand provide the desired speed variation, however, alternating current power is generally the only type now supplied by utilities. In order, therefore, to operate direct current motors from an alternating current source of power, numerous control systems have been advised including the Ward-Leonard system and various systems including thyratron tubes. These systems have been most advantageously employed for operating larger direct current motors; the costs involved have generally precluded their use on direct current motors in the smaller sizes.

It is therefore desirable to provide a system for operating a direct current motor and for selectively controlling the speed thereof from an alternating current source, such a system being sufficiently inexpensive to permit its general use with small direct current motors. The cost element involved will preclude the use of rotating machines, as in the Ward-Leonard type systems, and also the use of thyratron-type tubes since these tubes themselves are expensive and further since the use of a half-wave tube rectifying circuit requires de-rating the motor, e.g., using a nominally one-half horsepower rated motor to obtain one-third horsepower. It is therefore apparent that to satisfy the economic requirement, a control system utilizing static magnetic components must be provided.

There is an additional requirement which must be met by such a system, namely the provision of good regulation of motor speed for changes in load, i.e., at any given speed setting, the motor speed should remain relatively constant over wide changes in load. The speed of a direct current motor is conventionally represented by the formula $$n = \frac{V - I_a R_a}{K \phi N}$$

where $n$ is speed, $V$ is the line voltage, $I_a$ the armature current, $R_a$ the armature resistance, $\phi$ the field flux and $K$ and $N$ are constants for any given motor. The factor $I_a R_a$ is referred to as "armature drop" and it will be seen that it is directly proportional to armature or load current. It is thus seen that motor speed is directly proportional to the net voltage available, i.e., line voltage minus armature drop and inversely proportional to field flux. In the case of a separately excited shunt-wound motor where field flux remains constant, it will be seen that the motor speed on any given line voltage will decrease with increasing load. In order, therefore, to provide a direct current motor speed control system with good speed regulation for changes in load current, it is necessary to compensate for armature drop. There is thus added to the previously set forth requirements the additional requirement that the control system compensate for armature drop.

Circuits for operating direct current motors and for controlling the motor speed from an alternating current source and which purportedly compensated for armature drop have been proposed in the past. These circuits in general included an adjustable output voltage autotransformer for selecting the desired operating voltage and speed, a rectifier for supplying armature current, and a saturable core reactor having a saturating winding energized by armature current. In one such arrangement, the alternating current winding of the saturable core reactor was connected in series with the primary winding of a boosting transformer across the alternating current source, the transformer secondary being connected in series between the autotransformer and the rectifier. With no load and thus minimum armature current, the impedance of the alternating current winding of the saturable core reactor was high thus providing minimum voltage from the boosting transformer. Theoretically, as the armature current increased, the impedance of the alternating current winding of the saturable core reactor decreased, thus increasing the voltage output of the boosting transformer and impressing on the rectifier a boosting voltage sufficient to compensate for armature drop. In practice, however, since the increase in armature current with increasing load is linear, the reduction of impedance of the alternating current winding of the saturable core reactor is also linear. This reduction of the impedance of the alternating current winding is naturally accompanied by an increase in current, the net result being that the voltage drop across the alternating current winding does not drop sufficiently to cause a corresponding increase in boosting voltage sufficient adequately to compensate for armature drop. Stated differently, the increase in ampere turns of the saturating winding of the saturable core reactor would have to increase more nearly as the square of the armature current rather than directly proportional thereto in order to provide sufficient net change in boosting voltage to compensate for armature drop.

In addition to the foregoing, with the circuit described, the varying reactance of the alternating current windings of the saturable core reactor is a part of the motor armature circuit, and thus, the boosting voltage must overcome not only the armature resistance drop, but also a reactance drop. The circuit described above is therefore not satisfactory where good regulation of motor speed for variations in load is desired since it fails adequately to compensate for armature drop.

Another form of circuit proposed places the alternating current winding of the saturable core reactor directly in series with the autotransformer and the rectifier, the saturating winding again being in series with the motor armature and thus energized by armature current. This circuit is a bucking rather than a boosting arrangement, i.e., with low armature current the impedance of the alternating current winding of the saturable core reactor is highest thus reducing the voltage applied to the rectifier from that available at the autotransformer. Again, theoretically as armature current increases, the impedance of the saturable core reactor alternating current winding is reduced thus causing the voltage applied to rectifier more nearly to approach the autotransformer voltage thereby to compensate for armature drop. This circuit is however subject to the same defects as the previously described circuit, i.e., due to the linear action of the saturable core reactor, adequate compensation for armature drop is not provided and additional varying reactance is introduced into the armature circuit.

It is therefore desirable to provide a control system of the type here under consideration which will provide more complete compensation for armature reaction than previous systems and it is further desirable that such a system present minimum impedance to the armature circuit.

It is, therefore, an object of this invention to provide an improved control system for operating a direct current motor and selectively controlling the speed thereof from a source of alternating current.

Another object of this invention is to provide an improved direct current motor speed control system having good regulation of motor speed for changes in motor load.

Yet another object of this invention is to provide an improved direct current motor speed control system having more adequate compensation for armature drop than previous systems.

Still another object of this invention is to provide an improved direct current motor speed control system which presents minimum impedance to the motor armature circuit.

A still further object of this invention is to provide an improved system for operating a direct current motor and controlling the speed thereof from an alternating current source which does not utilize rotating machines nor thyratron-tubes.

Further objects and advantages of this invention will be apparent from the following description and the accompanying drawings and the features of novelty which characterize this invention will be pointed out with particularity in the claims annexed to and forming a part of this specification.

This invention in its broader aspects provides a control system for operating a direct current motor and for selectively controlling the speed thereof from an alternating current source, the system comprising transformer means having its input adapted to be connected across a source of alternating current and having a selectively variable voltage output. A pair of saturable core reactors are provided each having at least one alternating current winding and at least one direct current saturating winding, the alternating current windings being serially connected. Connections are provided for impressing an alternating current voltage on the serially connected alternating current windings of the saturable core reactor. Rectifying means are provided along with connections for impressing the output voltage of the transformer and the voltage appearing across the alternating current winding of one of the saturable core reactors across the input of the rectifying means. The direct current saturating windings of the saturable core reactors and the output of the rectifying means are adapted to be connected in circuit with the motor armature so that the saturating windings are energized in response to motor armature current. In addition, one of the saturable core reactors has at least one additional direct current saturating winding adapted to have a direct current voltage impressed thereon.

Figure 1:
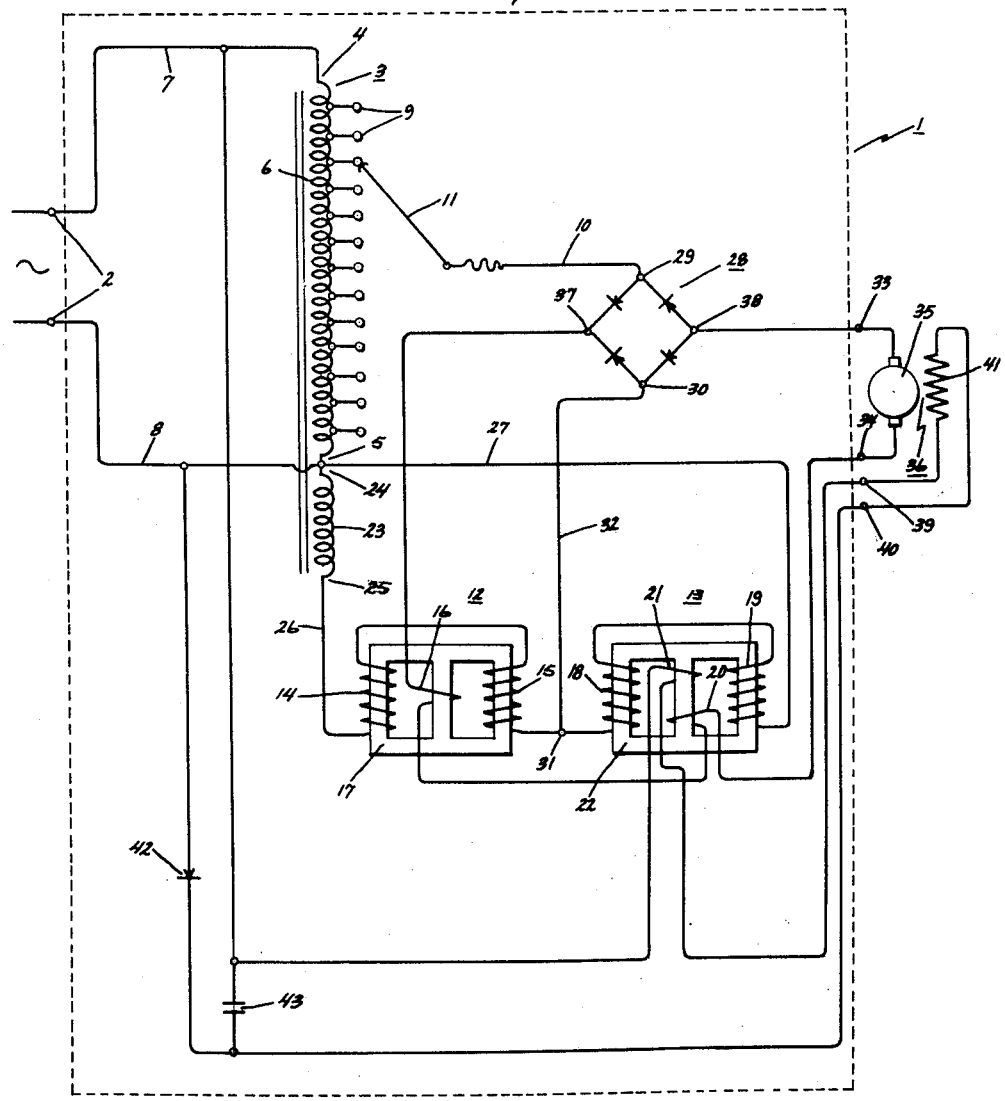
Fig. 1 is a schematic illustration showing the preferred embodiment of the improved motor circuit control circuit of this invention.

Referring now to Fig. 1, the improved direct current motor speed control system of this invention, generally identified as 1 includes a pair of input terminals 2 adapted to be connected to a suitable external source of alternating current, such as 120 volts, 60 cycles. An autotransformer 3 is provided, shown here as having the ends 4 and 5 of its winding 6 connected respectively to input terminals 2 by conductors 7 and 8. While the entire winding 6 of autotransformer 3 is shown as being connected across input terminals 2, it will be readily understood that in any specific design it may be desirable to connect only a portion of winding 6 to the input terminals. Winding 6 of autotransformer 3 has a plurality of taps 9 adapted to be selectively connected to output conductor 10 by a suitable tap switch 11. While autotransformer 3 is shown as having a plurality of output taps 9 and tap switch 11, it will be readily understood that an autotransformer of the continuously variable voltage variety may be employed.

A pair of saturable core reactors 12 and 13 are provided, reactor 12 having alternating current windings 14 and 15 positioned on the outer legs and direct current saturating winding 16 positioned on the center leg of three-legged core member 17, and reactor 13 having alternating current windings 18 and 19 positioned on the outer legs and direct current saturating windings 20 and 21 positioned on the center leg of three-legged core member 22. Autotransformer 3 is provided with another winding 23 having its one end 24 connected to end 5 of winding 6 and conductor 8. Alternating current windings 14 and 15 of saturable core reactor 12, and 18 and 19 of saturable core reactor 13 are connected in series across ends 24 and 25 of winding 23 of autotransformer 3 by conductors 26 and 27 respectively.

A bridge rectifier 28 is provided having its one input terminal 29 connected to tap switch 11 by conductor 10 and its other input terminal 30 connected by conductor 32 to the midpoint 31 between alternating current winding 15 of reactor 12 and alternating current winding 18 of reactor 13. It is thus seen that the voltage impressed across the input terminals 29 and 30 of rectifier 28 is the combination of the voltage of winding 6 of autotransformer 3 selected by tap switch 11 and the voltage appearing across the alternating current windings 18 and 19 of reactor 13; in the embodiment of Fig. 1, windings 6 and 23 of autotransformer 3 and 18 and 19 of saturable core reactor 13 are so arranged that these voltages are additive.

A pair of output terminals 33 and 34 are provided, adapted to be connected to armature 35 of shunt-wound direct current motor 36. Output terminals 37 and 38 of bridge-rectifier 28 are serially connected with direct current saturating windings 16 and 20 of saturable core reactors 12 and 13 across output terminals 33 and 34 and it will thus be seen that the armature current of direct current motor 36 energizes direct current saturating windings 16 and 20.

Another pair of output terminals 39 and 40 are provided adapted to be connected to shunt field exciting winding 41 of direct current motor 36. A half-wave rectifier 42 is provided connected in series between output terminal 40 and conductor 8. Saturating winding 21 of saturable core reactor 13 provides a fixed direct current bias and is connected in series between output terminal 39 and conductor 7. It is thus seen that shunt field winding 41 of motor 36 and bias winding 21 of reactor 13 are serially energized by half wave rectifier 42 from input terminals 2. Smoothing capacitor 43 is connected across bias winding 21 and field winding 41 as shown.

The operation of the system of Fig. 1 will now be described. With input terminals 2 connected to a suitable source of alternating current, motor armature output terminals 33 and 34 connected to the armature of a shunt-wound direct current motor and shunt field terminals 39 and 40 connected to the shunt field of the motor, the desired speed is set with selector switch 11 which determines the voltage between output conductor 10 and end 5 of winding 6 of autotransformer 3. The voltage induced in winding section 23 of autotransformer 3, as indicated above, is additive to the voltage in winding section 6 and is potentially available to boost the voltage across conductor 10 and end 5 of winding section 6 to compensate for armature drop in armature 35 of motor 36. With no load on motor 36, the armature current is nearly zero. Under these circumstances, the core 17 of saturable core reactor 12 will be unsaturated and the alternating current windings 14 and 15 will therefore have their maximum impedance. The bias current flowing in direct current saturating winding 21 of saturable core reactor 13 will, however, saturate core 22 and therefore alternating current windings 18 and 19 will have their minimum impedance which is very low. It will thus be seen that substantially all of the voltage induced in winding 23 of autotransformer 3 will appear across alternating current windings 14 and 15 of saturable core reactor 12 while practically none of that voltage will appear across alternating current windings 18 and 19 of saturable core reactor 13. Since the voltage appearing across alternating current windings 18 and 19 of saturable core reactor 13 is added to the voltage selected by tap switch 11 from winding section 6 of autotransformer 3 and applied to input terminals 29 and 30 of bridge rectifier 28, it will be seen that at no load, the voltage applied to rectifier 28 is essentially the voltage selected from winding 6 of autotransformer 3 by tap switch 11.

As the torque load on motor 36 is increased, the armature current increases. Direct current saturating winding 20 of saturable core reactor 13 opposes direct current saturating winding 21 and thus the increase in armature current with increased load tends to cancel the effect of the fixed bias provided by direct current saturating winding 21 so that the net flux density in core 22 is decreased thereby increasing the reactance of windings 18 and 19. On the other hand, the increase in armature current flowing in direct current saturating winding 16 of saturable core reactor 12 increases the flux density in core 17 thereby decreasing the reactance of alternating current windings 14 and 15. Therefore, as the load on motor 36 increases, the reactance of windings 18 and 19 of saturable reactor 13 increases and the voltage appearing across these windings correspondingly increases. Since the voltage appearing across windings 18 and 19 is added to the voltage selected by tap switch 11 from winding 6 of autotransformer 3 across input terminals 29 and 30 of rectifier 28, an increase in load on the motor 36 results in an increase in voltage applied to the rectifier to compensate for the increased armature drop.

At a high value of load on motor 36, core 22 of saturable core reactor 13 is unsaturated so that alternating current windings 18 and 19 have their maximum reactance whereas core 17 of saturable core reactor 12 is saturated so that alternating current windings 14 and 15 have their minimum reactance. Under this condition, substantially all of the voltage induced in winding section 23 of autotransformer 3 appears across alternating current windings 18 and 19 of saturable core reactor 13 and the voltage appears across windings 14 and 15 of saturable core reactor 12 is practically zero.

It will now be observed that neither saturable core reactor 12 nor saturable core reactor 13 is used merely to vary the impedance of the armature circuit but on the contrary that these two saturable core reactors serve in essence as a voltage divider across winding section 23 of autotransformer 3 to pick off a voltage suitable for compensating the armature drop of motor 36. It will also be observed that the total impedance in the armature circuit attributable to saturable core reactors 12 and 13 remains essentially constant and that the combination of the two saturable core reactors simulates very nearly a variable voltage autotransformer, the setting of which is controlled by its own load current to give an output voltage proportional to current. It will be seen that with low armature current and core 22 of saturable core reactor 13 saturated, the alternating current windings 18 and 19 have very low reactance and thus the additional impedance in the circuit of armature 35 of motor 36 is very low. On the other hand, at high armature current, core 17 of saturable core reactor 12 is saturated and thus alternating current windings 14 and 15 have very low reactance and in this case, the windings 14 and 15 and the low impedance source of alternating current in essence short circuit windings 18 and 19 of saturable core reactor 13 so that the circuit of armature 35 of motor 36 still has low impedance.

It will now be readily apparent that with this improved circuit, the impedance in the armature circuit attributable to the saturable core reactors 12 and 13 is always low and that therefore there is no necessity that the change in impedance in the saturable core reactors be fast enough to compensate for armature drop as in the case of previous circuits. On the contrary, in the present circuit, the net boosting voltage as determined by the division of impedance between saturable core reactor 12 and saturable core reactor 13 is the determining factor and that can vary directly with armature current in order to compensate completely for armature drop.

A system has been assembled in accordance with Fig. 1 for operating a ½ horsepower direct current motor. In this system, winding section 6 of autotransformer 3 had 230 turns of .0480 inch diameter wire with 8 speed selection taps 9. Winding section 23 of autotransformer 3 had 94 turns of .0480 inch diameter wire and the system was connected to a 115 volt, 60 cycle source of alternating current. Windings 14 and 15 of saturable core reactor 12 each had 81 turns of .0641 inch diameter wire while direct current saturating winding 16 had 112 turns of .0605 inch diameter wire. Core member 17 of saturable core reactor 12 had a stack height of 1.51 inches and was 4⅛ inches long and 3 7/16 inches wide with the outer legs being 11/16 inch wide and the center leg 1⅜ inches wide. Alternating current windings 18 and 19 of saturable core reactor 13 each had 104 turns of .0253 inch diameter wire, direct current saturating winding 20 had 28 turns of .0480 inch diameter wire and direct current bias winding 21 had 1170 turns of .0142 inch diameter wire. Core 22 of saturable core reactor 13 had a stack height of 1.44 inches and was 3⅜ inches long and 2 13/16 inches wide with the outer legs being 9/16 inch wide and the center leg being 1⅛ inches wide. Capacitor 43 had a capacitance of 40 microfarads. Germanium rectifiers were used for rectifiers 28 and 42 since they have a lower drop than other dry-type rectifiers, such as selenium.

Figure 4:
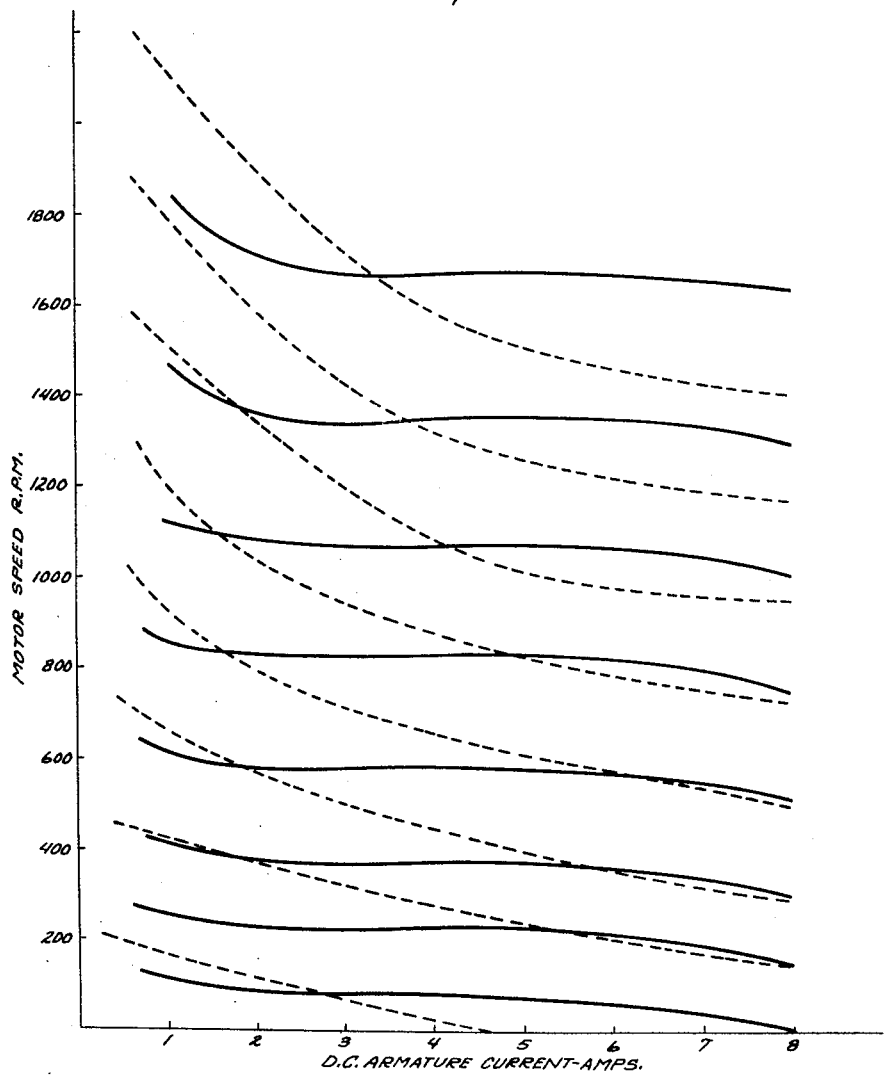
Fig. 4 is a set of speed torque curves comparing the performance of the circuit of Fig. 1 with a conventional shunt-wound direct current motor.

Fig. 4 shows five typical speed torque curves, i.e., motor speed plotted against armature current, obtained with the system of Fig. 1 described above (shown in solid lines) compared with the speed torque curve of the motor alone without the improved armature drop compensating arrangement of this invention (shown in dotted lines). It will be observed that the speed regulation of the motor, i.e., control of speed with increasing armature current, with the circuit of Fig. 1 is greatly improved over the speed regulation of the same shunt excited motor operated without the improved armature drop compensating circuit of this invention.

Figure 2:
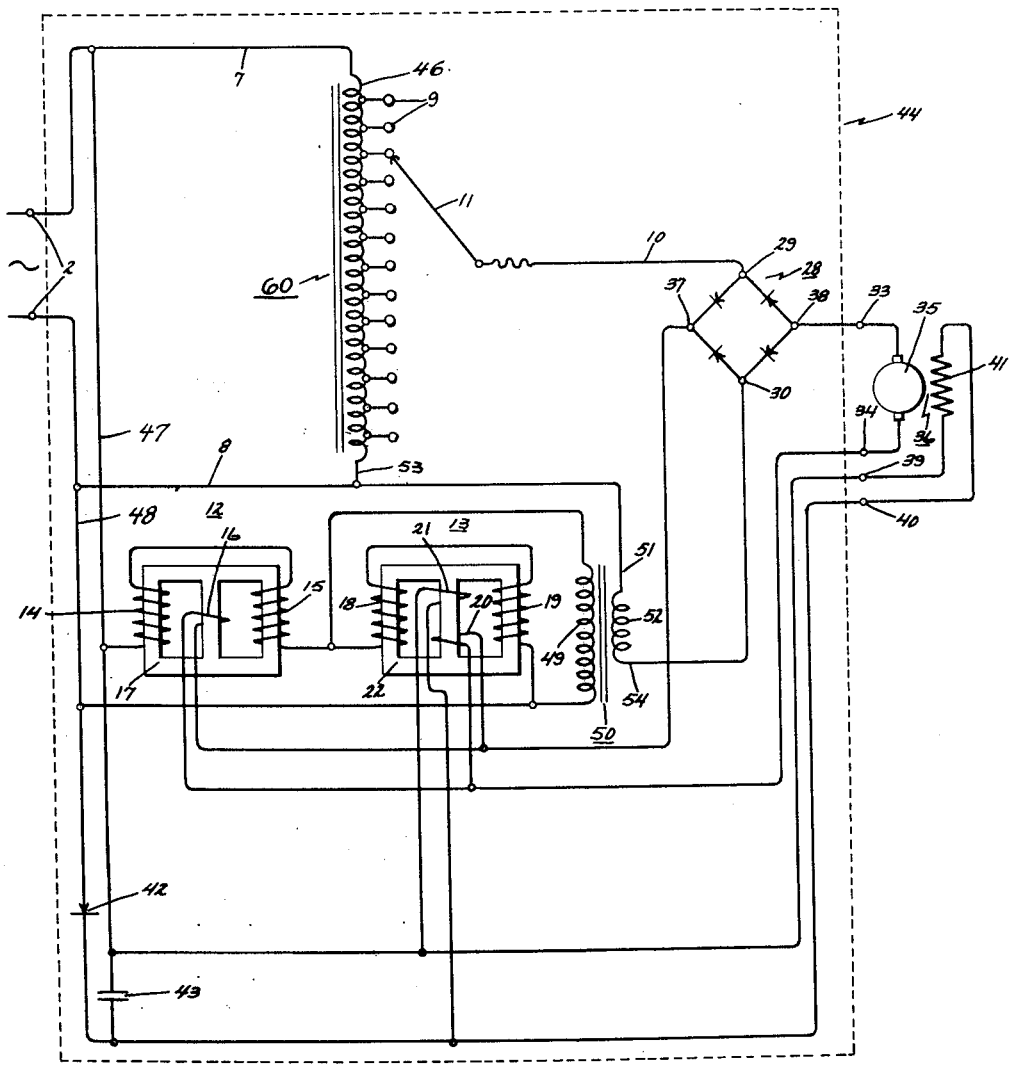
Fig. 2 is another schematic illustration showing another embodiment of the improved motor speed control system of this invention.

Referring now to Fig. 2 in which like elements are indicated by like reference numerals, the speed control system, generally identified as 44, includes again input terminals 2 adapted to be connected to a suitable external source of alternating current such as 115 volts, 60 cycles. Here, autotransformer 60 is shown as having all of its winding 46 connected across input terminals 2 by conductors 7 and 8, it being understood that in any given design, less than the entire winding 46 may be connected to the input terminals. Winding 46 of autotransformer 60 is again provided with a plurality of taps 9 which are selectively engaged by tap switch 11 which is connected to one input terminal 29 of rectifier 28 by means of conductor 10.

Saturable core reactors 12 and 13 are again provided, reactor 12 having alternating current windings 14 and 15 and reactor 13 having alternating current windings 18 and 19, the alternating current windings being serially connected across input terminals 2 by means of conductors 47 and 48. In the circuit of Fig. 2, alternating current windings 18 and 19 of saturable core reactor 13 are connected across primary winding 49 of boosting transformer 50 which has one end 51 of its secondary winding 52 connected to the end of winding 46 of autotransformer 60 to which conductor 8 is also connected and which has its other end 54 connected to the other input terminal 30 of rectifier 28. It is thus seen that the voltage output of autotransformer 60 selected by tap switch 11 and the voltage output of boosting transformer 61 are additively impressed on the input of rectifier 28. Here, direct current saturating winding 16 of saturable core reactor 12 and direct current saturating winding 20 of saturable core reactor 13 are connected in parallel across output terminal 37 of rectifier 28 and motor armature output terminal 34, rather than in series as in Fig. 1.

In order to energize direct current bias winding 21 of saturable core reactor 13 and shunt field exciting winding 41 of direct current motor 36, half wave rectifier 42 and capacitor 43 are again provided. Here, however, in contrast with the circuit of Fig. 1, the direct current bias winding 21 and the shunt field output terminals 39 and 40 to which shunt field exciting winding 41 of motor 36 is adapted to be connected, are connected in parallel.

The operation of the circuit of Fig. 2 is very similar to that of the circuit shown in Fig. 1, i.e., load current drawn by the armature 35 flows through direct current saturating windings 16 and 20 of saturable core reactors 12 and 13 respectively. At no load with minimum armature current flowing, the core 22 of saturable core reactor 13 will be saturated by the bias current flowing in the direct current bias winding 21 and alternating current windings 18 and 19 will therefore have minimum reactance. On the other hand, core 17 of saturable core reactor 12 will be substantially unsaturated and alternating current windings 14 and 15 will therefore have their maximum reactance. Since, alternating current windings 14 and 15 of saturable core reactor 12 and alternating current windings 18 and 19 of saturable core reactor 13 are connected in series across the source of alternating current, the input voltage will divide across the two reactors in direct proportion to their relative reactances and since alternating current windings 18 and 19 have very low reactance compared with the reactance of alternating current windings 14 and 15, substantially no voltage will appear across primary winding 49 of boosting transformer 50. Substantially no voltage will therefore be induced in secondary winding 52 and therefore, the voltage impressed across input terminals 29 and 30 of rectifier 28 will be essentially that selected from winding 46 of autotransformer 60 by tap switch 11. At a high value of load, however, and with maximum armature current flowing, the armature current flowing in direct current saturating winding 20 of saturable core reactor 13 will substantially cancel the effect of the bias of winding 21 so that core 22 will be substantially unsaturated and alternating current windings 18 and 19 will have their maximum reactance. On the other hand, the armature current flowing in direct current saturating winding 16 of saturable core reactor 12 will substantially saturate core 17 so that alternating current windings 14 and 15 will have their minimum reactance. Under these conditions, substantially all of the voltage appearing across the serially connected alternating current windings 14 and 15 of saturable core reactor 12 and 18 and 19 of saturable core reactor 13 will appear across windings 18 and 19 and thus across primary winding 49 of boosting transformer 50. Maximum boosting voltage will therefore be induced in secondary winding 52 of boosting transformer 50 which will be added to the voltage selected by tap switch 11 from winding 46 of autotransformer 60 and maximum voltage therefore impressed across input terminals 29 and 30 of rectifier 28 thereby compensating for the increased armature drop in armature 35 of direct current motor 36.

It will be readily apparent that as in the system of Fig. 1, the reactance impressed in the circuit of armature 35 of motor 36 by saturable core reactors 12 and 13 is at all times very low and substantially constant and furthermore that the saturable core reactors 12 and 13 function as a voltage divider or variable voltage autotransformer in supplying a boosting voltage proportional to load current to compensate for armature drop. As in the case of the system of Fig. 1, the saturable core reactors 12 and 13 do not serve merely to vary the reactance of the armature circuit but on the contrary provide a boosting voltage which substantially compensates for armature drop.

Figure 3:
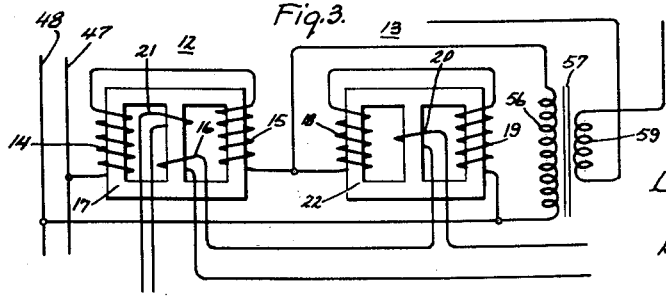
Fig. 3 is a fragmentary schematic illustration showing rearrangement of the circuit of Fig. 2 to provide bucking rather than boosting action.

It may be desirable in certain installations to provide bucking rather than boosting voltage to compensate for armature drop and a modification of the system of Fig. 2 to accomplish this result is shown in Fig. 3. Here, with like elements again indicated by like reference numerals, direct current bias winding 21 is positioned on core 17 of saturable reactor 12 and is thus associated with direct current saturating winding 16 rather than with direct current saturating winding 20 of saturable core reactor 13. In addition, the connections of the secondary winding 59 of transformer 57 are reversed from those which prevail in the system of Fig. 2, as shown in Fig. 3. It is thus seen that with minimum armature current, core 17 of saturable core reactor 12 is saturated by virtue of the current flowing in direct current bias winding 21 so that alternating current windings 14 and 15 have their minimum reactance whereas core 22 of saturable core reactor 13 is substantially unsaturated so that alternating current windings 18 and 19 have their maximum reactance. This being the case, substantially all of the voltage appearing input terminals 2 appears across alternating current windings 18 and 19 of saturable core reactor 13 and thus across secondary winding 59 of transformer 57. The voltage induced in winding 59 is therefore a maximum and by virtue of the connection shown opposes the voltage selected by tap switch 11 so that the voltage impressed on input terminals 29 and 30 of rectifier 28 is a minimum. As armature current increases to a high value, the armature current flowing in direct current saturating winding 16 cancels the effect of the bias current flowing in direct current bias winding 21 of saturable core reactor 12 so that core 17 becomes unsaturated and alternating current windings 14 and 15 have reached their maximum reactance whereas the armature current flowing in direct current saturating winding 20 of saturable core reactor 13 substantially saturates core 22 so that alternating current windings 18 and 19 have their minimum reactances. Under these conditions, substantially all of the voltage across input terminals 2 appears across alternating current windings 14 and 15 of saturable core reactor 12 and virtually no voltage appears across alternating current windings 18 and 19 of saturable core reactor 13 and thus across primary winding 56 of transformer 57. A minimum bucking voltage therefore appears across secondary winding 59 of transformer 57 and thus the voltage impressed on input terminals 29 and 30 of rectifier 28 is substantially that selected by tap switch 11. It is thus seen that with the circuit of Fig. 3, maximum bucking voltage is provided at minimum load current, this bucking voltage being decreased in response to increased load current thereby compensating for the increased armature drop. It will be readily seen that in all other respects, the circuit of Fig. 3 is identical to that shown in Fig. 2 and it will be readily understood that the system of Fig. 1 can likewise be modified to provide bucking rather than boosting voltage, if desired.

It will now be readily apparent that this invention provides an improved system for operating a direct current motor and for selectively varying the speed thereof from a source of alternating current, the system providing substantially complete compensation for armature drop and being comprised entirely of static components.

While I have illustrated and described specific embodiments of this invention, further modifications and improvements will occur to those skilled in the art, and I desire that it be understood therefore that this invention is not limited to the specific form shown and I intend in the appended claims to cover all modifications within the spirit and scope of this invention.

What I claim as new and desire to secure by Letters Patent of the United States is:

1. A control system for operating a direct current motor and for selectively controlling the speed thereof from an alternating current source, said system comprising a pair of alternating current input terminals, transformer means having its input connected across said input terminals and having a selectively variable voltage output, a pair of variable impedance means each including a saturable core reactor having at least one alternating current winding and at least one direct current saturating winding, said alternating current windings being serially connected, connections for impressing an alternating current voltage on said serially connected alternating current windings, rectifying means, one of said variable impedance means having terminals across which is developed a voltage proportional to the impedance of the respective saturable core reactor, connections for impressing the output voltage of said transformer and the voltage appearing across said one variable impedance means terminals across the input of said rectifying means, a pair of direct current motor armature output terminals, said direct current saturating windings and the output of said rectifying means being connected in circuit with said output terminals whereby said direct current saturating windings are energized responsive to motor armature current, one of said saturable core reactors having at least one additional direct current saturating winding, and connections for impressing a direct current voltage on said last-named direct current saturating winding, said last-named direct current winding being arranged to magnetize said one reactor oppositely from the first mentioned direct current winding thereon, whereby the impedance of the alternating current winding of said one reactor is changed in magnitude in one direction with increasing armature current simultaneously as the impedance of the alternating current winding of the other reactor is changed in magnitude in the other direction.

2. A control system for operating a direct current motor and for selectively controlling the speed thereof from an alternating current source, said system comprising a pair of alternating current input terminals, transformer means having its input connected across said input terminals and having a selectively variable voltage output, a pair of variable impedance means each including a saturable core reactor having at least one alternating current winding and at least one direct current saturating winding, said alternating current windings being serially connected, connections for impressing an alternating current voltage on said serially connected alternating current windings, rectifying means, one of said variable impedance means having terminals across which is developed a voltage proportional to the impedance of the respective saturable core reactor, connections for impressing the output voltage of said transformer and the voltage appearing across said one variable impedance means terminals additively across the input of said rectifying means, a pair of direct current armature output terminals, said direct current saturating windings and the output of said rectifying means being connected in circuit with said output terminals whereby said direct current saturating windings are energized in response to motor armature current, said one saturable core reactor having at least one additional direct current saturating winding, and connections for impressing a direct current voltage on said last-named current saturating winding, said last-named direct current winding being arranged to magnetize said one reactor oppositely from the first mentioned direct current winding thereon, whereby the impedance of the alternating current winding of said one reactor is changed in magnitude in one direction with increasing armature current simultaneously as the impedance of the alternating current winding of the other reactor is changed in magnitude in the other direction.

3. A control system for operating a direct current motor and for selectively controlling the speed thereof from an alternating current source, said system comprising a pair of alternating current input terminals, an autotransformer having at least a part of its winding connected across said input terminals, means for selectively varying the output voltage of said autotransformer, a pair of variable impedance means each including a saturable core reactor having at least one alternating current winding and at least one direct current saturating winding, said alternating current windings being serially connected, connections for impressing an alternating current voltage responsive to the voltage across said input terminals across said serially connected alternating current windings, a bridge rectifier, one of said variable impedance means having terminals across which is developed a voltage proportional to the impedance of the respective saturable core reactor, connections for impressing the output voltage of said autotransformer and the voltage appearing across said one variable impedance means terminals additively across the input terminals of said rectifier, a pair of direct current motor armature output terminals, said direct current saturating windings and the output terminals of said rectifier being connected in series across said armature output terminals whereby motor armature current energizes said direct current saturating windings, said one saturable core reactor having at least one additional direct current saturating winding, and another rectifier connected to energize said last-named direct current saturating winding from said input terminals, said last-named direct current winding being arranged to magnetize said one reactor oppositely from the first mentioned direct current winding thereon, whereby the impedance of the alternating current winding of said one reactor is increased with increasing armature current simultaneously as the impedance of the alternating current winding of the other reactor is decreased.

4. A control system for operating a direct current motor and for selectively controlling the speed thereof from an alternating current source, said circuit comprising a pair of alternating current input terminals, transformer means having its input connected across said input terminals and having a selectively variable voltage output, a pair of saturable core reactors each having at least one alternating current winding and at least one direct current saturating winding, said alternating current windings being serially connected across said input terminals, a second transformer having its primary winding connected across the alternating current winding of one of said saturable core reactors, rectifying means, connections for impressing the output voltage of the secondary winding of said second transformer and the output of said transformer means across the input of said rectifying means, a pair of direct current motor armature output terminals, said direct current saturating windings and the output of said rectifying means being connected in circuit with said output terminals whereby said direct current saturating windings are energized in response to motor armature current, one of said saturable core reactors having at least one additional direct current saturating winding, and connections for impressing a direct current voltage on said last-named direct current saturating winding, said last-named direct current winding being arranged to magnetize said one reactor oppositely from the first mentioned direct current winding thereon, whereby the impedance of the alternating current winding of said one reactor is changed in magnitude in one direction with increasing armature current simultaneously as the impedance of the alternating current winding of the other reactor is changed in magnitude in the other direction.

5. A control system for operating a direct current motor and for selectively controlling the speed thereof from an alternating current source, said system comprising a pair of alternating current input terminals, an autotransformer having at least a part of its winding connected across said input terminals, means for obtaining a selectively variable output voltage from said autotransformer, a pair of saturable core reactors each having at least one alternating current winding and at least one direct current saturating winding, said alternating current windings being serially connected across said input terminals, a second transformer having its primary winding connected across the alternating current winding of one of said saturable core reactors and having one end of its secondary winding connected to one end of said autotransformer winding, rectifying means, said means for obtaining a selectively variable voltage and the other end of said transformer secondary winding being connected to the input of said rectifying means thereby additively impressing the voltage outputs of said autotransformer and said second transformer on said rectifying means, a pair of direct current motor output terminals, said direct current saturating windings and the output of said rectifying means being connected in circuit with said output terminals whereby said direct current saturating windings are energized in response to motor armature current, said one saturable core reactor having at least one additional direct current saturating winding, and connections for impressing a direct current voltage on said last-named direct current saturating winding, said last-named direct current winding being arranged to magnetize said one reactor oppositely from the first mentioned direct current winding thereon, whereby the impedance of the alternating current winding of said one reactor is increased with increasing armature current simultaneously as the impedance of the alternating current winding of the other reactor is decreased.

6. A control system for operating a direct current motor and for selectively controlling the speed thereof from an alternating current source, said system comprising a pair of alternating current input terminals, an autotransformer having at least a part of its winding connected across said input terminals, means for obtaining a selectively variable output voltage from said autotransformer, a pair of saturable core reactors each having at least one alternating current winding and at least one direct current saturating winding, said alternating current windings being serially connected across said input terminals, a second transformer having its primary winding connected across the alternating current winding of one of said saturable core reactors and having one end of its secondary winding connected to one end of said autotransformer winding, a bridge rectifier, said means for obtaining a selectively variable voltage and the other end of said second transformer secondary winding being connected respectively to the input terminals of said rectifier thereby additively impressing the voltage outputs of said autotransformer and said second transformer on said bridge rectifier, a pair of direct current motor armature output terminals, said direct current saturating windings and the output terminals of said rectifier being connected in circuit with said armature output terminals whereby said direct current saturating windings are energized in response to motor armature current, said one saturable core reactor having at least one additional direct current saturating winding, and another rectifier connected to energize said last-named direct current saturating winding from said input terminals, said last-named direct current winding being arranged to magnetize said one reactor oppositely from the first mentioned direct current winding thereon, whereby the impedance of the alternating current winding of said one reactor is increased with increasing armature current simultaneously as the impedance of the alternating current winding of the other reactor is decreased.

7. A control system for operating a direct current motor and for selectively controlling the speed thereof from an alternating current source, said system comprising a pair of alternating current input terminals, an autotransformer having a first winding portion and a second winding portion, at least a part of said first winding portion of said autotransformer being connected across said input terminals, means for obtaining a selectively variable voltage output from said first winding portion of said autotransformer, a pair of saturable core reactors each having at least one alternating current winding and at least one direct current saturating winding, said alternating current windings being serially connected across said second winding portion of said autotransformer, rectifying means, connections for impressing the output voltage of said first autotransformer winding portion and the voltage appearing across one of said alternating current windings across the input of said rectifying means, a pair of direct current motor armature output terminals, said direct current saturating windings and the output of said rectifying means being connected in circuit with said output terminals whereby said direct current saturating windings are energized in response to motor armature current, one of said saturable core reactors having at least one additional direct current saturating winding, and connections for impressing a direct current voltage on said last-named direct current saturating winding, said last named direct current winding being arranged to magnetize said one reactor oppositely from the first mentioned direct current winding thereon, whereby the impedance of the alternating current winding of said one reactor is increased with increasing armature current simultaneously as the impedance of the alternating current winding of the other reactor is decreased.

8. A control system for operating a direct current motor and for selectively controlling the speed thereof from an alternating current source, said system comprising a pair of alternating current input terminals, an autotransformer having a first winding portion and a second winding portion, at least a part of said first winding portion of said autotransformer being connected across said input terminals, means for obtaining a selectively variable voltage output from said first winding portion of said autotransformer, a pair of saturable core reactors each having at least one alternating current winding and at least one direct current saturating winding, said alternating current windings being serially connected across said second winding portion of said autotransformer, rectifying means, said means for obtaining a selectively variable voltage and the midpoint between said alternating current windings being respectively connected to the input of said rectifying means thereby additively impressing the voltage output of said first autotransformer winding portion and the voltage appearing across one of said alternating current windings on said rectifying means, a pair of direct current motor output terminals, said direct current saturating windings and the output of said rectifying means being connected in series across said output terminals whereby motor armature current energizes said direct current saturating winding, said one saturable core reactor having at least one additional direct current saturating winding, and connections for impressing a direct current voltage on said last-named direct current saturating winding.

9. A control system for operating a direct current motor and for selectively controlling the speed thereof from an alternating current source, said system comprising a pair of alternating current input terminals, an autotransformer having a first winding portion and a second winding portion, at least a part of said first winding portion of said autotransformer being connected across said input terminals, means for obtaining a selectively variable voltage output from said first winding portion of said autotransformer, a pair of saturable core reactors each having at least one alternating current winding and at least one direct current saturating winding, said alternating current windings being serially connected across said second winding portion of said autotransformer, a bridge rectifier, said means for obtaining a selectively variable voltage and the midpoint between said alternating current winding being connected respectively to the input terminals of said first bridge rectifier thereby additively impressing the voltage output of said first autotransformer winding portion and the voltage appearing across one of said alternating current windings on said bridge rectifier, a pair of direct current motor output terminals, said direct current saturating windings and the output terminals of said rectifier being connected in series across said armature output terminals whereby motor armature current energizes said direct current saturating windings, said one saturable core reactor having at least one additional direct current saturating winding, and another rectifier connected to energize said last-named direct current saturating winding from said input terminals.

References Cited in the file of this patent

UNITED STATES PATENTS

| | | |
|---|---|---|
| 2,558,086 | Herchenroeder | June 26, 1951 |
| 2,743,409 | Howes | Apr. 24, 1956 |
| 2,769,129 | Gifford et al. | Oct. 30, 1956 |